US011775471B2

(12) United States Patent
Babet et al.

(10) Patent No.: US 11,775,471 B2
(45) Date of Patent: Oct. 3, 2023

(54) SYSTEM AND METHOD FOR CACHING CONVERTED FILES AND COMPILING COMPUTER CODE FROM THE CACHE (71) Applicant: Embarcadero Technologies, Inc., Austin, TX (US)

(72) Inventors: Jeanmarie Bruneau Babet, Santa Cruz, CA (US); Roger Paul Lawrence, Hamilton, MT (US)

(73) Assignee: EMBARCADERO TECHNOLOGIES, INC., Austin, TX (US)

( * ) Notice: Subject to any disclaimer, the term of this patent is extended or adjusted under 35 U.S.C. 154(b) by 321 days.

(21) Appl. No.: 17/003,794

(22) Filed: Aug. 26, 2020

(65) Prior Publication Data

US 2021/0103553 A1 Apr. 8, 2021

Related U.S. Application Data (60) Provisional application No. 62/912,240, filed on Oct. 8, 2019.

(51) Int. Cl.
*G06F 16/00* (2019.01)
*G06F 16/11* (2019.01)
*G06F 16/172* (2019.01)
*G06F 12/0891* (2016.01)
*G06F 8/71* (2018.01)
*G06F 8/41* (2018.01)

(52) U.S. Cl.
CPC .............. *G06F 16/116* (2019.01); *G06F 8/44* (2013.01); *G06F 8/71* (2013.01); *G06F 12/0891* (2013.01); *G06F 16/172* (2019.01)

(58) Field of Classification Search
CPC ..... G06F 8/34; G06F 8/10; G06F 8/00; G06F 8/20; G06F 8/77; G06F 8/71; G06F 16/16; G06F 8/30; G06F 11/368; G06F 8/36; G06F 8/41; G06F 9/44; G06F 8/60; G06F 9/44505; G06Q 10/103
See application file for complete search history.

(56) References Cited

U.S. PATENT DOCUMENTS

| 7,882,499 B2* | 2/2011 | Post .................... G06F 9/45504 717/138 |
| 10,129,359 B2* | 11/2018 | Ekbote .................... G06F 21/12 |
| 2007/0203877 A1* | 8/2007 | Qu ......................... G06F 16/172 |
| 2011/0016460 A1* | 1/2011 | Archambault ...... G06F 11/3624 717/158 |

(Continued)

*Primary Examiner* — Yicun Wu
(74) *Attorney, Agent, or Firm* — Foley & Lardner LLP (57) ABSTRACT A conversion system includes a build manager, a file storage device to store original files associated with computer code or data of a project build, a compiler, a cache to store converted files, and an interceptor to provide requested files to the compiler. The interceptor includes one or more processors and memory storing instructions that cause the processor(s) to receive a plurality of file requests for files from the compiler during compilation between a starting and an ending of at least a portion of the project build, examine the cache to determine whether a requested file is stored in the cache for each of the file requests received between the starting and ending of the portion of the project build, and provide the requested file to the compiler.

20 Claims, 5 Drawing Sheets (56) References Cited

U.S. PATENT DOCUMENTS

| | | | |
|---|---|---|---|
| 2012/0324417 A1* | 12/2012 | Somani | G06F 8/30 |
| | | | 717/101 |
| 2015/0378727 A1* | 12/2015 | Doyle | G06F 8/4434 |
| | | | 712/240 |
| 2016/0092183 A1* | 3/2016 | Radigan | G06F 8/4435 |
| | | | 717/159 |

* cited by examiner

SYSTEM AND METHOD FOR CACHING CONVERTED FILES AND COMPILING COMPUTER CODE FROM THE CACHE

CROSS-REFERENCE TO RELATED APPLICATIONS AND CLAIM OF PRIORITY

This application claims the benefit of U.S. Provisional Application No. 62/912,240, filed Oct. 8, 2019, the content of which is fully incorporated herein by reference in its entirety.

BACKGROUND

The present disclosure relates generally to systems and methods for compiling computer code. The present disclosure relates more particularly to improved systems and methods for generating a project-wide cache of converted source and header files for compiling computer code.

A compiler converts computer code written in one programming language to another programming language. For example, a compiler may convert source code from a high level programming language (e.g., C, C++, Java, FORTRAN, Pascal, and/or the like) to a lower level language (e.g., assembly language, object code, machine code, and/or the like) to generate code that can be executed by a computer (e.g., an executable program). Generally, in order for a compiler to properly translate the characters (e.g., identifiers, special characters, international characters, and/or the like) encoded in a source file or header file, the compiler may require (or expect) the source files and header files to be encoded in (or converted to) a particular format (e.g., UTF-8). For example, some compilers may enable developers to specify the encoding format of the source and/or header files, and may convert (or translate) the source and/or header files to a default encoding format each time the files are needed, read, or received. However, the converting process of the source and header files each time they are needed or received when compiling computer code is time consuming and memory intensive. Accordingly, improved systems and methods for compiling computer code may be desired.

The above information disclosed in this Background section is for enhancement of understanding of the background of the invention, and therefore, it may contain information that does not constitute prior art.

SUMMARY

Example embodiments described herein relate to a software or data conversion system including a build manager configured to manage a project build; a file storage device communicatively connected to the build manager and configured to store original files associated with computer code or data of the project build; a compiler or converter configured to compile or convert the computer code or data; a cache configured to store converted files associated with the computer code or data; and an interceptor configured to provide requested files to the compiler or converter during compilation or conversion of the computer code or data. The interceptor includes one or more processors and memory coupled to the one or more processors and storing instructions. The instructions, when executed by the one or more processors, cause the one or more processors to receive a plurality of file requests for files from the compiler during compilation or conversion of the computer code or data between a starting and an ending of at least a portion of the project build; examine the cache to determine whether a requested file is stored in the cache, for each of the file requests received between the starting and ending of the portion of the project build; and provide the requested file to the compiler or converter.

In further examples of that system, the instructions further cause the one or more processors to determine that the file is stored in the cache; and in response to determining that the file is stored in the cache, provide the file from the cache to the compiler or converter.

In further examples, the file stored in the cache has been converted in response to a previous file request for the same file from the compiler or converter during compilation or conversion of the computer code or data.

In further examples, the instructions further cause the one or more processors to determine that the file is not stored in the cache; and provide the file from the file storage device to the compiler or converter.

In further examples, the instructions further cause the one or more processors to retrieve the file from the file storage device; examine the file to determine whether the file should be converted; convert the file in response to determining that the file should be converted; and store the converted file in the cache.

In further examples, the build manager is configured to determine whether the file is in need of conversion, and to assign a flag associated with the file indicating whether the file should be converted.

In further examples, the build manager is configured to determine whether the file is in need of conversion based on a file type of the file.

In yet further examples, the build manager is configured to determine whether the file is in need of conversion based on a comparison of an encoding of the file and a default expected encoding of the compiler or the converter.

In further examples of the above system, the interceptor is configured to purge the cache for a new project build.

In further examples, the interceptor is configured to purge particular files from the cache in response to the particular files being modified between compilations or conversions.

Further example embodiments relate to a method for compiling or converting computer code or data of a project build. In such examples, the method includes storing, by one or more processors, original files associated with the computer code or data in a file storage device; receiving, by one or more processors, a file request for a file from a compiler or converter during compilation of the computer code or conversion of the data; examining, by the one or more processors, a cache to determine whether the file is stored in the cache; and providing, by the one or more processors, the file to the compiler or the converter.

In further examples, the method further includes determining, by the one or more processors, that the file is stored in the cache; and in response to determining that the file is stored in the cache, providing, by the one or more processors, the file from the cache to the compiler or the converter.

In further examples, the file stored in the cache has been converted in response to a previous file request for the same file from the compiler during compilation of the computer code or from the converter during conversion of the data.

In further examples, the method further includes determining, by the one or more processors, that the file is not stored in the cache; and providing, by the one or more processors, the file from the file storage device to the compiler or the converter.

In further examples, the method further includes retrieving, by the one or more processors, the file from the file storage device; examining, by the one or more processors, the file to determine whether the file should be converted; converting, by the one or more processors, the file in response to determining that the file should be converted; and storing, by the one or more processors, the converted file in the cache.

In further examples, the method further includes determining, by the one or more processors, whether the file is in need of conversion; and assigning, by the one or more processors, a flag associated with the file indicating whether the file should be converted.

In further examples, determining of whether the file is in need of conversion is based on a file type of the file.

In further examples, determining of whether the file is in need of conversion is based on a comparison of an encoding of the file and a default expected encoding of the compiler or the converter.

In further examples, the method further includes purging, by the one or more processors, the cache in response to a new project build.

In further examples, the method further includes purging, by the one or more processors, particular files from the cache in response to the particular files being modified between compilations or conversions.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description.

Computing Device

Figure 1:
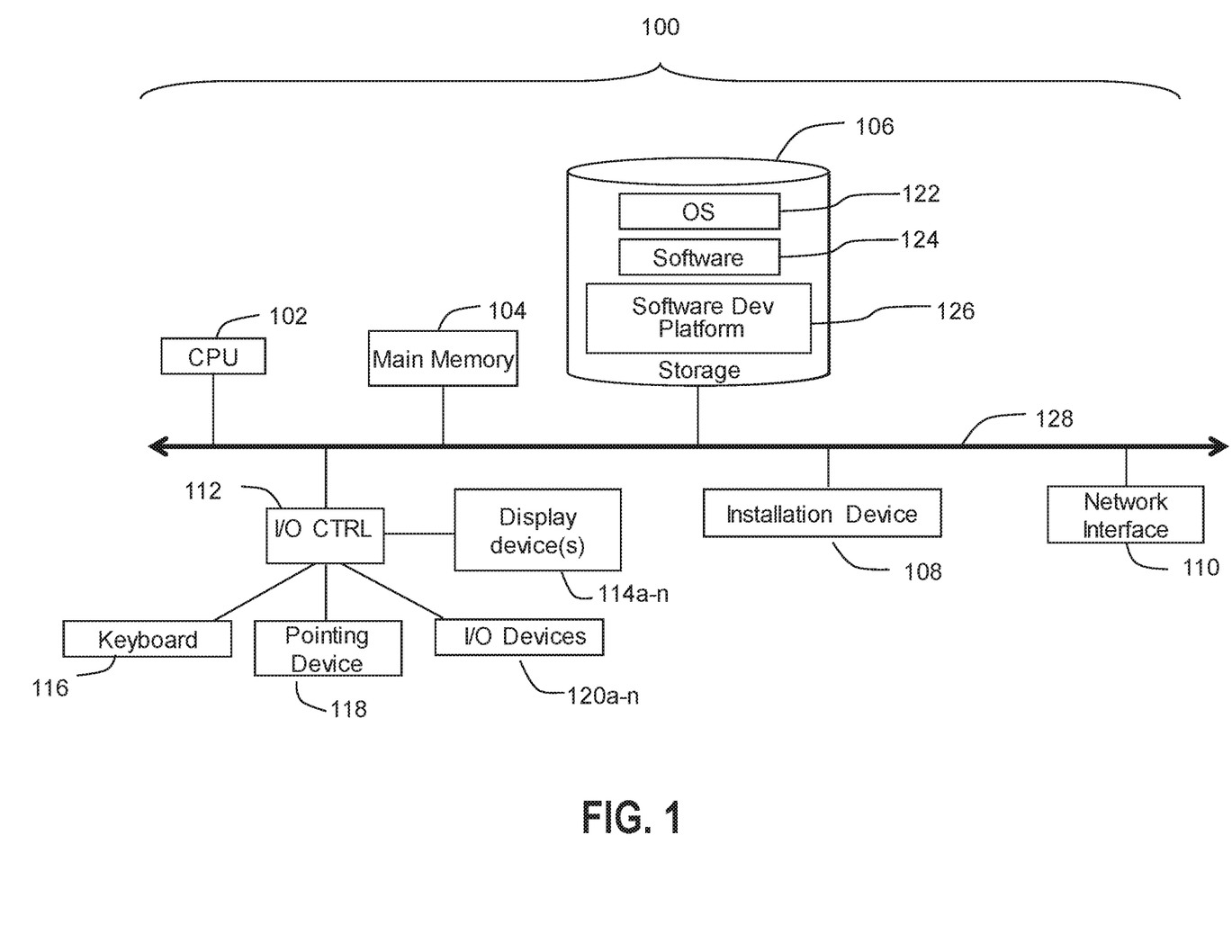
FIG. 1 is a block diagram of a computing device, according to some embodiments.

Referring now to FIG. 1, a block diagram of a computing device is shown, according to some embodiments. The computing device 100 may be useful for practicing one or more embodiments of the present disclosure. As shown in FIG. 1, in some embodiments, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 may include, without limitation, an operating system (OS) 122, software 124, a software instance of a software development platform (or tool) 126, and a GUI application 127. The computing device 100 may also include additional optional elements, for example, such as a memory port, a bridge, one or more input/output devices 120 (e.g., 120a-120n), and cache memory in communication with the central processing unit 102.

In some embodiments, the central processing unit 102 may be any suitable logic circuitry that responds to and processes instructions fetched from the main memory unit 104. In some embodiments, the central processing unit 102 is provided by a microprocessor unit. For example, in some embodiments, the microprocessor unit may include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 may be based on any of these processors, or any other suitable processor capable of operating as described herein. In various embodiments, the central processing unit 102 may utilize instruction level parallelism, thread level parallelism, different levels of cache, and/or multi-core processors. A multi-core processor may include two or more processing units on a single computing component. Examples of a multi-core processors include the AMD PHENOM IIX2, INTEL CORE i5 and INTEL CORE i7.

In some embodiments, the main memory unit 104 may include one or more memory chips capable of storing data and allowing any storage location to be directly accessed by the central processing unit 102. In some embodiments, the main memory unit 104 may be volatile and faster than the storage device 106. In various embodiments, the main memory unit 104 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some embodiments, the main memory 104 or the storage device 106 may be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 may be based on any of the above described memory chips, or any other available memory chips capable of operating as described herein. In some embodiments, the central processing unit 102 communicates with the main memory unit 104 via a system bus 128 (described in more detail below). In other embodiments, the central processing unit 102 may communicate directly with the main memory unit 104 via a memory port.

In some embodiments, the central processing unit 102 may communicate directly with cache memory via a secondary bus, sometimes referred to as a backside bus. In other embodiments, the central processing unit 102 may communicate with cache memory using the system bus 128. Cache memory typically has a faster response time than the main memory unit 104, and is typically provided by SRAM, BSRAM, or EDRAM. In some embodiments, the central processing unit 102 communicates with various I/O devices 120 via a local system bus (e.g., the system bus 128). Various buses may be used to connect the central processing unit 102 to any of the I/O devices 120, including a PCI bus, a PCI-X bus, or a PCI-Express bus, or a NuBus. In embodiments in which the I/O devices 120 include a video display device 114, the central processing unit 102 may use an Advanced Graphics Port (AGP) to communicate with the display device 114 or the I/O controller 112 for the display device 114.

In various embodiments, a wide variety of I/O devices 120a-120n may be included in the computing device 100. For example, in various embodiments, the input devices of the I/O devices 120a-n may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various embodiments, the output devices of the I/O devices 120a-n may include, for example, video displays, graphical displays, speakers, headphones, inkjet printers, laser printers, and/or 3D printers.

In some embodiments, I/O devices 120a-120n may include a combination of multiple input or output devices, such as, for example, Microsoft KINECT, Nintendo Wiimote for the WII, Nintendo WII U GAMEPAD, Apple IPHONE, Android based smart phones, and/or the like. In some embodiments, some of the I/O devices 120a-120n may allow gesture recognition inputs through a combination of some of the inputs and outputs. In some embodiments, some of the I/O devices 120a-120n may provide for facial recognition, which may be utilized as an input for different purposes including authentication and other commands. In some embodiments, some of the I/O devices 120a-120n may provide for voice recognition and inputs, such as, for example, Microsoft KINECT, SIRI for IPHONE by Apple, Google Now or Google Voice Search, and/or the like.

In some embodiments, addition I/O devices 120a-120n may have both input and output capabilities, including, for example, haptic feedback devices, touchscreen displays, multi-touch displays, and/or the like. Touchscreen, multi-touch displays, touchpads, touch mice, or other touch sensing devices may use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices may allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, may have larger surfaces, such as on a table-top or on a wall, and may also interact with other electronic devices. In some embodiments, some of the I/O devices 120a-120n, display devices 114a-114n, or group of devices may be augment reality devices. In some embodiments, the I/O devices (e.g., keyboard 116, pointing device 118, display devices 114, and/or I/O devices 120) may be controlled by the I/O controller 112. In some embodiments, an I/O device may also provide storage and/or an installation medium (e.g., installation device 108) for the computing device 100. In still other embodiments, the computing device 100 may provide USB connections to receive handheld USB storage devices. In further embodiments, an I/O device 120 may be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some embodiments, the display devices 114a-114n may be connected to the I/O controller 112. In various embodiments, the display devices 114a-114n may include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays may include, for example, stereoscopy, polarization filters, active shutters, autostereoscopy, and/or the like. Display devices 114a-114n may also include a head-mounted display (HMD). In some embodiments, display devices 114a-114n or the corresponding I/O controllers 112 may be controlled through or have hardware support for OPENGL, DIRECTX API, and/or other graphics libraries.

In some embodiments, the computing device 100 may include or connect to multiple display devices 114a-114n, which each may be of the same or different type and/or form. As such, any of the I/O devices 120a-120n and/or the I/O controller 112 may include any type and/or form of suitable hardware, software, or combination of hardware and software to support, enable or provide for the connection and use of multiple display devices 114a-114n by the computing device 100. For example, the computing device 100 may include any type and/or form of video adapter, video card, driver, and/or library to interface, communicate, connect or otherwise use the display devices 114a-114n. In one embodiment, a video adapter may include multiple connectors to interface to multiple display devices 114a-114n. In other embodiments, the computing device 100 may include multiple video adapters, with each video adapter connected to one or more of the display devices 114a-114n. In some embodiments, any portion of the operating system 122 of the computing device 100 may be configured for using multiple displays 114a-114n. In other embodiments, one or more of the display devices 114a-114n may be provided by one or more other computing devices connected to the computing device 100, via a network. In some embodiments software may be designed and constructed to use another computer's display device as a second display device 114a for the computing device 100. For example, in one embodiment, an Apple iPad may connect to a computing device 100 and use the display of the computing device 100 as an additional display screen that may be used as an extended desktop. One of ordinarily skill in the art will recognize and appreciate the various ways and embodiments that a computing device 100 may be configured to have multiple display devices 114a-114n.

In some embodiments, the storage device 106 (e.g. one or more hard disk drives or redundant arrays of independent disks) may store the operating system 122, and/or other related software, and may store application software programs such as any program related to the software instance of the software development platform 126. Examples of the storage device 106 may include hard disk drive (HDD), optical drive including CD drive, DVD drive, and/or BLU-RAY drive, solid-state drive (SSD), USB flash drive, and/or any other suitable device for storing data. Some storage devices 106 may include multiple volatile and non-volatile memories, such as, for example, solid state hybrid drives that combine hard disks with solid state cache. Some storage devices 106 may include non-volatile, mutable, and/or read-only. Some storage devices 106 may be internal and may connect to the computing device 100 via the bus 128. Some storage devices 106 may be external and may be connect to the computing device 100 via an I/O device 120 that provides an external bus. Some storage devices 106 may connect to the computing device 100 via the network interface 110 over a network, such as, for example, the Remote Disk for MACBOOK AIR by Apple. Some computing devices 100 may not require a non-volatile storage device 106 and may be thin clients or zero clients. Some storage devices 106 may also be used as an installation device 108, and may be suitable for installing software and programs. Additionally, the operating system and the software can be run from a bootable medium, for example, such as a bootable CD (e.g. KNOPPIX), which may be a bootable CD for GNU/Linux that is available as a GNU/Linux distribution from knoppix.net.

In some embodiments, the computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on the computing device 100. An application distribution platform may include a repository of applications on a server or a cloud, which the computing device 100 may access over a network (e.g., the Internet). An application distribution platform may include application developed and provided by various developers. A user of the computing device 100 may select, purchase, and/or download an application via the application distribution platform.

In some embodiments, the computing device 100 may include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one embodiment, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some embodiments, the network interface 110 may include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some embodiments, the computing device 100 may operate under the control of the operating system 122, which controls scheduling of tasks and access to system resources. In various embodiments, the computing device 100 may run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Washington; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but may include others. Some operating systems 122, including, for example, the CHROME OS by Google, may be used on zero clients or thin clients (e.g., CHROMEBOOKS).

In various embodiments, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some embodiments, the computing device 100 may have different processors, operating systems, and input devices consistent with the device.

In some embodiments, the computing device 100 may be a gaming system. For example, the computing device 100 may include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, NINTENDO WII U, and/or Nintendo Switch device manufactured by Nintendo Co., Ltd., of Kyoto, Japan, an XBOX 360, XBOX one, and/or the like manufactured by the Microsoft Corporation of Redmond, Washington, and/or the like.

In some embodiments, the computing device 100 may be a digital audio player such as the Apple IPOD, IPOD Touch, and IPOD NANO lines of devices, manufactured by Apple Computer of Cupertino, California. Some digital audio players may have other functionality, including, for example, a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some embodiments, the computing device 100 may be a tablet, for example, such as the IPAD line of devices by Apple; GALAXY TAB family of devices by Samsung; KINDLE FIRE, by Amazon.com, Inc. of Seattle, Washington; and/or the like. In other embodiments, the computing device 100 may be a eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Software Development Platform

Figure 2:
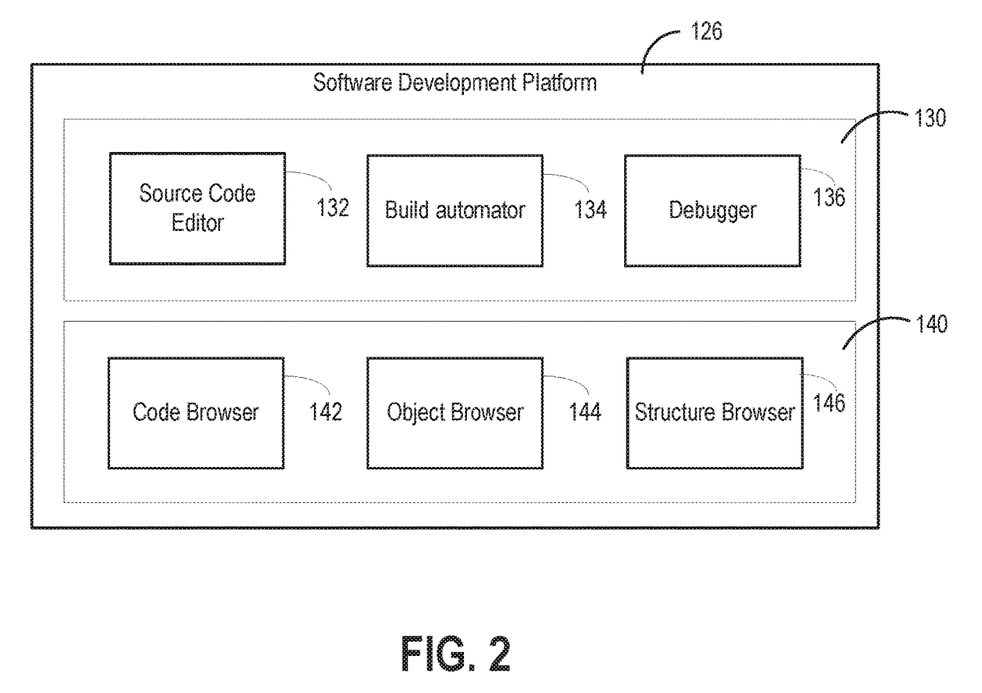
FIG. 2 is a block diagram depicting a software development platform, according to some embodiments.

Referring now to FIG. 2, a block diagram depicting the software development platform 126 of FIG. 1 is shown in more detail, according to some embodiments. In some embodiments, the software development platform 126 is a software program executed on the computing device 100. In other embodiments, the software development platform 126 may be hosted on a cloud computing platform including one or more controllers, servers, and/or any other suitable computing devices that can be accessed by the computing device 100 over a network (e.g., the Internet) via the network interface 110. In some embodiments, the software development platform 126 may include or be a part of a software development environment to facilitate software developers in building software applications for various different operating systems. For example, in some embodiments, the software development platform 126 may be part of an integrated development environment (IDE), such as any of the RAD Studio product lines developed by Embarcadero Technologies. However, in other embodiments, the software development platform 126 may be a separate design tool (e.g., computer program) that facilitates the development of software applications, graphical user interfaces (GUIs), and/or software builds for various different computer programs, computer applications, mobile applications, operating systems, devices, and/or interfaces.

For example, in some embodiments, the software development platform 126 may facilitate software developers in designing a computer application or a GUI for the computer application. In some embodiments, the software development platform 126 may facilitate in the design of the computer application for a particular type of computing device (e.g., a particular type of operating system) or for various different computing devices (e.g., various different operating systems). For example, in some embodiments, the software development platform 126 may include virtualization software to virtually simulate different operating systems, computing devices, and/or platforms, so that the software developer can view and design GUIs having consistent look and feel across various devices, operating systems, and platforms.

In some embodiments, the software development platform 126 may generate a plurality of versions of the computer application so that each version is tailored to execute or run on a different type of computing device, operating system, or platform. In various embodiments, such different versions may be created automatically or under control (e.g., user input) of the software developer. Accordingly, in some embodiments, a software developer may utilize the software development platform 126 to design an application or a GUI for the application to run on more than one type of device, operating system, or platform. For a non-limiting example, the software development platform 126 may facilitate in the design of the computer application to execute on a desktop computer running a Windows operating system and a smart phone running an Android operating system. However, in other embodiments, other types of devices and operating systems may be employed, for example, such as any of the devices and/or operating systems described above with reference to FIG. 1.

In more detail, as shown in FIG. 2, the software development platform 126 may include a code generator 130 and a developer interface 140. In some embodiments, the code generator 130 facilitates in the generation of software code and software builds for a computer application or a GUI for the computer application. For example, in some embodiments, the code generator 130 may include a source code editor 132. In some embodiments, the source code editor 132 may be a textual-based computer program configured to enable software developers to read, write, and edit the source code of a graphical user interface (GUI), a computer application, or any other suitable computer program. In some embodiments, the source code editor 132 may include features that simplify the generation of source codes, such as, for example, syntax checking, syntax highlighting, autocomplete, brace matching, and/or the like. In some embodiments, the source code editor 132 may include a structure editor that enables software developers to edit the structure of the source code using a syntax tree.

In some embodiments, the code generator 130 may further include a build automator 134, a debugger 136, and/or the like. In some embodiments, the build automator 134 facilitates the creation of a software build, including, for example, compiling code, packaging code, running automated tests, and/or the like. In some embodiments, the debugger 136 facilitates testing and debugging of the code, for example, by enabling various test functions such as querying processors, resolving symbols, interpreting expressions, single-stepping, program animation, breaking, tracking, verifying, reverse debugging, source-level debugging, symbolic debugging, low-level debugging, machine-language debugging, and/or the like. However, in other embodiments, the code generator 130 may include any number of suitable modules or functions to facilitate in the generation, build, and/or debugging of computer code associated with the computer application or GUI for the computer application.

In some embodiments, the developer interface 140 may provide an interface (e.g., GUI) to a software developer to interact with various graphics, components, and/or controls (collectively referred to as objects) to develop the computer application or GUI for the computer application using a component based development model. For example, in some embodiments, the developer may utilize the pointing device 118 to select and position various objects into a design area (or design surface) of a visual designer (e.g., a 2-dimensional and/or 3-dimensional designer, editor, and/or the like) for generating a GUI associated with the computer application via the developer interface 140. In some embodiments, the design area may include, for example, a window, form, card, pane, frame, 3-dimensional design area or surface, and/or the like, such that the objects arranged on the design area are shown at runtime as they would appear on a display window, mobile display screen, subsets (e.g., controls, portions of a window or screen, or the like) of a larger UI, or the like.

In some embodiments, the objects may include, but are not limited to, predefined visual objects, control objects (e.g., buttons, links, sliders, and/or the like), graphics (e.g., images), text, text fields, effects, buttons, animations, UI controls, and/or the like. In some embodiments, the software development platform 126 may include one or more libraries or databases of various predefined, customized, and/or imported objects that may be used for creating the computer application or the GUI for the computer application. These objects may have various properties, each having a default or original property value that may be modified or changed by software developers as needed or desired to configure the objects.

For example, in some embodiments, predefined visual objects may be graphics that are used to create standard features in a computer application, such as a menu. In some embodiments, a software developer may also use the original objects, custom created objects, or imported objects to design the computer application or GUI for the computer application. In some embodiments, such custom created objects and imported objects may be added to the databases (e.g., libraries or storage) to be retrieved for later use, and may be stored with original or default property values that define the custom created objects and imported objects. Some non-limiting examples of various visual property types may include text fonts, styles, sizes, and colors. Other non-limiting example of various visual property types may include location (e.g., top, left, width, height, etc.), size, style, texture, color, effect, shape, image, animation, and/or the like. However, the property types can include various different types of properties other than visual properties, for example, such as behavioral properties that define controls (or functions) of objects, relational properties that define relationships (e.g., connections) between objects, and/or the like.

As shown in FIG. 2, in some embodiments, the developer interface 140 may include a code browser 142, an object browser 144, and a structure browser 146. In some embodiments, the code browser 142 enables software developers to browse, navigate, and visualize the source code for the GUI or the computer application. For example, the code browser 142 presents the source code in a window or section of the developer interface 140 to enable software developers to browse, navigate, and modify the source code. In some embodiments, the object browser 144 enables software developers to visualize the hierarchy of the objects (e.g., graphics, components, and/or controls) for the computer application or GUI for the computer application, including properties and events as well as other pertinent information associated with the objects. In some embodiments, the object browser also provides an interface in a window or section of the developer interface 140 to enable interaction with the objects and/or their properties. In some embodiments, the structure browser 146 enables software developers to visualize the structure of the source code by showing the code's classes, attributes, operations, and relationships among objects in a class diagram (e.g., a tree diagram) describing the parent-child relationship of the objects and controls with respect to other objects and controls.

Figure 3:
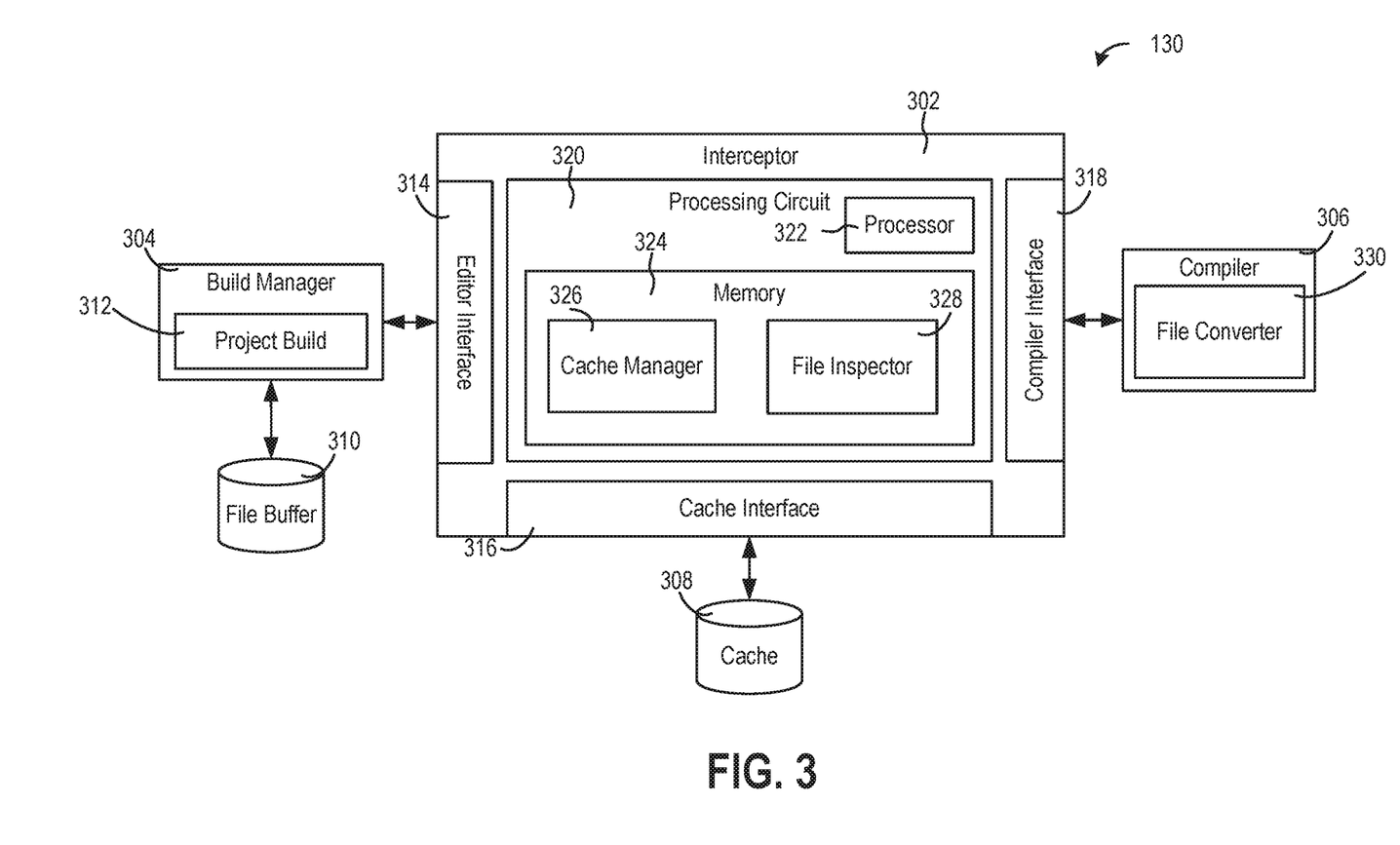
FIG. 3 is a block diagram depicting some components of a code generator, according to some embodiments.

Referring now to FIG. 3, a block diagram of some of the components of the code generator 130 is shown in more detail, according to some embodiments. In some embodiments, the code generator 130 may generate and manage a project-wide cache of converted files or data structures (such as, but not limited to source and/or header files) for a compiler, translator or other converter, such that compilation or conversion times are improved (e.g., minimized or reduced). In particular examples, the code generator 130 generates and manages a compilation or conversion process in which files or data structures are compiled or converted over an entire build (or a designated portion of a build) that involves a plurality of files or data structures. In such examples, the files or data structures may include source and/or header files. In other examples, the build may include other types of files or data structures, as described herein. In some embodiments, the code generator 130 may manage the content of the cache to ensure that converted files or data structures are stored in the cache are up-to-date (e.g., the latest version). In some embodiments, the code generator 130 may manage storage requirements of the cache to prevent or reduce over-consumption of cache memory.

As shown in FIG. 3, in some embodiments, the code generator 130 illustratively includes an interceptor 302, a build manager 304, and a compiler 306. In other embodiments, the code generator 130 may include other or additional components and devices commonly found in a server computer or similar computing device, such as, for example, various input/output devices. Before describing the code generator 130 in more detail, it should be noted that the components of the code generator 130 can be integrated within a single device or distributed across multiple separate systems or devices. For example, in various embodiments, the code generator 130 and/or its components (e.g., the interceptor 302, the build manager 304, and/or the compiler 306) may be embodied as any suitable type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device.

In other embodiments, some or all of the components of the code generator 130 can be implemented as part of a cloud-based computing system. For example, in some embodiments, the code generator 130 may be embodied as a "virtual server" formed from multiple computing devices distributed across a network and operating in a public or private cloud. In still other embodiments, some or all of the components of the code generator 130 can be components of the software development platform 126. For example, in various embodiments, each of the build manager 304, the interceptor 302, and the compiler 306 may be parts of the build automator 134 or parts of the source code editor 132 shown in FIG. 2. In other embodiments, the build manager 304 may be a part of the source code editor 132 shown in FIG. 2, and the interceptor 302 and the compiler 306 may be parts of the build automator 134 shown in FIG. 2. In another example, the build manager 304 and the interceptor 302 may be parts of the source code editor 132 shown in FIG. 2, and the compiler 306 may be an external (e.g., 3$^{rd}$ party) compiler or device. In still another example, the build manager 304 may be a part of the source code editor 132, and the interceptor 302 and the compiler 306 may be parts of an external (e.g., 3$^{rd}$ party) compiler or device. Accordingly, although each of the build manager 304, the interceptor 302, and the compiler 306 are illustrated in FIG. 3 as embodied as parts of the code generator 130, it should be appreciated that any of the build manager 304, the interceptor 302, the compiler 306, and/or their components may be embodied in one or more devices cooperating together to facilitate the functionalities described herein.

In use, as described further below, the build manager 304 maintains the computer code for a project build 312, and invokes the compiler 306 a plurality of times to compile the computer code of the project build 312. For example, the computer code of the project build 312 may be generated using a high-level computer programming language, for example, such as C, C++, Java, FORTRAN, Pascal, and/or the like. The computer code of the project build 312 may include various files (e.g., source files, header files, resource files, pre-compiled header files, and/or the like) that are encoded using any suitable encoding format. For example, source files and header files may be encoded in ASCII, ANSI, UTF-8, and/or the like. In other examples, the project build 312 may be composed of multiple files or data structures that are to be translated, encrypted, decrypted, or converted in some other defined manner.

During the compilation of one or more sources of the project build 312, the compiler 306 may come across a file retrieval statement (e.g., #include), such that the compiler 306 requests a corresponding file (e.g., header file, source file, resource file, pre-compiled header file, and/or the like) for the compilation. In some embodiments, the interceptor 302 may intercept inputs and outputs (I/O) of the compiler 306, and may manage a cache 308 of converted source and/or header files for retrieval as requested or needed by the compiler 306. For example, in some embodiments, when the build manager 304 invokes the compiler 306 to compile computer code, the interceptor 302 may intercept the communication to manage the content of the cache 308. Similarly, when the compiler 306 requests a file from the build manager 304 during compilation of the project build 312, the interceptor 302 may intercept the request to determine whether the cache 308 includes the requested file. Over the course of compiling an entire project build 312 (or a part of the project build 312), the interceptor 302 may intercept multiple requests for various files or data structures that form the project build 312. In some instances, the interceptor may intercept a request for a file or data structure that has already been previously compiled or converted for that same project build 312 and stored in the cache 308 (or that has been stored in the cache 308 for other reasons).

In some embodiments, if the cache 308 includes (e.g., stores or contains) the requested file, the interceptor 302 may provide the requested file from the cache 308 to the compiler 306, rather than requesting the file from the build manager 304. For project builds that include multiple requests for the same file, this ability to retrieve the requested file from the cache 308 (without requiring another compilation or conversion of the file) can reduce the time and processing resources needed to complete the project build. For project builds that include many requests (e.g. three or more) for the same file, the reduction in time and processing resources needed to complete the project build can be significant.

In some embodiments, if the cache 308 does not include the requested file, the interceptor 302 may request the file from the build manager 304, and the build manager 304 may provide the requested file (e.g., from a file buffer 310). In some embodiments, the interceptor 302 may examine the requested file received from the build manager 304 to determine whether the requested file needs conversion. In some embodiments, if the interceptor 302 determines that the requested file needs conversion, the file may be converted and stored in the cache 308, such that the converted file may be provided from the cache 308 for subsequent requests for the same file and for subsequent compilations within the same project build 312 without having to convert the file each time the file is needed or requested by the compiler 306 for that project build 312 (or portion of the project build 312). In some embodiments, the interceptor 302 may manage the cache 308 for multiple compilations on a project-wide basis (e.g., from a designated beginning of a project build 312 to a designated ending of the project build 312), such that the converted files in the cache 308 may be accessed and used for a plurality of compilations within the same project build 312. In some embodiments, the interceptor 302 may manage cache memory of the cache 308 to prevent or reduce over consumption of the cache memory.

In more detail, as shown in FIG. 3, in some embodiments, the interceptor 302 may include an editor interface 314, a cache interface 316, and a compiler interface 318. In some embodiments, the editor interface 314 facilitates communications between (to or from) the interceptor 302 and the build manager 304 for enabling access to original files (e.g., source files, header files, and/or the like) stored on a file buffer 310 (or other suitable storage device), and for receiving compilation or conversion commands (e.g., compilation calls) from the build manager 304. In certain examples, communications from the build manager 304 may include one or more instructions or calls indicating a beginning of a project build 312 and one or more instructions or calls indicating an ending of a project build 312. The communications may include one or more (or multiple) compilation or conversion commands or calls between the beginning of the project build and the ending of the project build. In some embodiments, the cache interface 316 facilitates communications between the interceptor 302 and the cache 308 to enable management of the content and cache memory of the cache 308. In some embodiments, the compiler interface 318 facilitates communications between the interceptor 302 and the compiler 306 to provide requested files to the compiler 306 during one or more compilations of the project build 312.

In various embodiments, interfaces 314, 316, and 318 can be or include wired or wireless communications interfaces (e.g., jacks, antennas, transmitters, receivers, transceivers, wire terminals, etc.) for conducting data communications with build manager 304, compiler 306, and cache 308. In various embodiments, communications via interfaces 314, 316, and 318 can be direct (e.g., local wired or wireless communications) or via a communications network (e.g., a WAN, the Internet, a cellular network, etc.). For example, interfaces 314, 316, and 318 can include an Ethernet card and port for sending and receiving data via an Ethernet-based communications link or network. In another example, interfaces 314, 316, and 318 can include a WiFi transceiver for communicating via a wireless communications network. In another example, at least one of interfaces 314, 316, and 318 can include cellular or mobile phone communications transceivers. In another example, at least one of interfaces 314, 316, and 318 may include an application programming interface (API) to enable access to the functionalities provided therein. In various embodiments, the interfaces 314, 316, and 318 may be logical parts of the same interface, or at least one of the interfaces 314, 316, and 318 may be different from the others.

Still referring to FIG. 3, in some embodiments, the interceptor 302 may include a processing circuit 320 including one or more processors 322 and memory 324. In other embodiments, the processing circuit 320 may be part of a processing circuit of the compiler 306 and/or a part of a processing circuit of the build manager 304. In some embodiments, the processing circuit 320 may be communicably connected to the editor interface 314, the cache interface 316, and/or the compiler interface 318 such that the processing circuit 320 and the various components thereof can send and receive data via interfaces 314, 316, and 318. In some embodiments, The processor 322 can be a general purpose or specific purpose processor, an application specific integrated circuit (ASIC), one or more field programmable gate arrays (FPGAs), a group of processing components, or other suitable processing components. The processor 322 may be configured to execute computer code and/or instructions stored in the memory 324 or received from other computer readable media (e.g., CDROM, network storage, a remote server, etc.).

In some embodiments, the memory 324 may include one or more devices (e.g., memory units, memory devices, storage devices, etc.) for storing data and/or computer code for completing and/or facilitating the various processes described in the present disclosure. In various embodiments, the memory 324 may include random access memory (RAM), read-only memory (ROM), hard drive storage, temporary storage, non-volatile memory, flash memory, optical memory, and/or any other suitable memory for storing software objects and/or computer instructions. The memory 324 may include database components, object code components, script components, or any other type of information structure for supporting the various activities and information structures described in the present disclosure. In some embodiments, the memory 324 may be communicably connected to the processor 323 via the processing circuit 320 and may include computer code for executing (e.g., by the processor 306) one or more processes described herein.

As shown in FIG. 3, in some embodiments, memory 324 includes a cache manager 326 and a file inspector 328. In some embodiments, the cache manager 326 and the file inspector 328 may be embodied as a dynamic-link library (dll) to manage the cache 308 and to handle (e.g., process) requests. For example, in some embodiments, the I/O of the compiler 306 may be channeled through a set of routines in a virtual file system (VFS) associated with the interceptor 302, such that these routines are redirected to entry points of the dll. In some embodiments, when the compiler 306 reaches a file retrieval statement (e.g., #include) while compiling computer code (e.g., source code), the compiler 306 may request the corresponding file, and the request may be channeled to the dll (e.g., cache manager 326 and file inspector 328) of the interceptor 302 to process the request. However, the present disclosure is not limited thereto, and in other embodiments, the cache manager 326 and the file inspector 328 may be embodied as any suitable non-transient computer readable instructions to perform the functions and features described herein.

In some embodiments, the cache manager 326 analyzes file requests received (or intercepted) from the compiler 306 for a project build 312, to determine whether the requested files were already stored in the cache 308 for that project build 312. For example, in some embodiments, the cache manager 326 may examine the cache 308 to determine whether a requested file is stored in the cache 308. In some embodiments, if the requested file is stored in the cache 308, the cache manager 326 may provide the requested file from the cache 308 to the compiler 306, without requesting (or accessing) the requested file in the file buffer 310 (or other storage device). In some embodiments, only files that have been converted are stored in the cache 308, such that any files stored in the cache 308 do not need to be converted again. However, the present disclosure is not limited thereto, and in other embodiments, the cache 308 may include some or all files that have been inspected (e.g., by the cache manager 326 or the file inspector 328) for the project build 312 (e.g., between starting and ending of the project build 412) whether or not those files have been converted (or need conversion), such that the requested files can be provided from the cache 308 rather than inspecting each of the requested files to determine whether the requested files need conversion each time they are retrieved from the file buffer 310 (or other storage device).

In some embodiments, if the cache 308 does not currently store the requested file, the requested file may be retrieved from the file buffer 310 (e.g., via the build manager 304), and the file inspector 328 may inspect the retrieved file to determine whether the file should be converted. For example, in some embodiments, the file inspector 328 may determine whether the requested file is a type of file that should be converted. For example, in some embodiments, the file inspector 328 may determine whether the requested file is a source file, header file, pre-compiled header (PCH) file, resource file, and/or the like. PCH files may be binary files that include a compressed version of multiple source files, and resource files may be binary files including descriptions of resource components (e.g., user interface (UI) components). In some embodiments, since PCH files and resource files may already be in binary format, these files may not need conversion, whereas source files and header files may contain encoded characters or identifiers that may need conversion according to the format (e.g., default format) accepted (or expected) by the compiler 306 for proper translation. For example, many compilers may expect source files and header files to be received in (or converted to) UTF-8 format, such that the identifiers, special characters, international characters, and/or the like included or contained in the files can be properly translated (or converted).

Accordingly, in some embodiments, the file inspector 328 may determine the type of the file by examining the file name or file buffer. For example, PCH files may be identified by the file extension (e.g., .pch) or from the first four bytes including the sequence "CPCH." Resource files may be identified from the first three bytes including the sequence 0xFF, 0x0A, and 0x00. Source files and header files may be identified by their file extensions (e.g., .c, .cpp, .h, .hpp, or the like), or may be identified from the first three bytes including the sequence 0xEF, 0xBB, and 0xBf, also known as the byte order mark (BOM) character sequence. In some embodiments, the file inspector 328 may determine whether the requested file is one of a source file, a header file, a PCH file, or a resource file to determine whether the requested file is the type of file that should be converted.

In other embodiments, the build manager 304 may determine whether the requested file is a type of file that should be converted, and may set (or assign) a flag associated with the requested file indicating that the requested file should be converted (or not converted). For example, in some embodiments, the build manager 304 may examine the file name or file buffer 310 to determine whether the requested file is the type of file (e.g., source, header, PCH, resource, or the like) that should be converted (or not converted). In some embodiments, the build manager 304 may determine whether a source file or header file should be converted based on instructions (a code page or other instruction format) defined by the developer and one or more default (or acceptable) instructions (e.g., a default code page or other format) used by the compiler 306. For example, in some embodiments, the build manager 304 may set a flag associated with the file when the user defined instruction is different from the default instruction used by the compiler 306. In other embodiments, the build manager 304 may set the flag associated with the requested file when the encoding (e.g., an encoding type) of the requested file is different from the default (or acceptable) instruction used by the compiler 306. In various embodiments, the build manager 304 may set the flag in response to receiving a file request for the requested file, or may set the flags for each of the files associated with the project build 312 prior to transmitting a compilation or conversion request (or compilation command) of the project build 312 to the compiler 306 (e.g., via the interceptor 302). Accordingly, in some embodiments, the file inspector 328 may inspect the requested file received from the build manager 304 to determine whether a flag associated with the requested file indicates that the requested file should be converted (or not converted).

In some embodiments, when the requested file is determined to need conversion and the cache 308 does not currently store a converted version of the requested file, the file inspector 328 (or the cache manager 326) may cause the file to be converted and stored in the cache 308. For example, in some embodiments, when the file inspector 328 determines that the requested file should be converted, and the cache manager 326 determines that the cache 308 does not currently include the requested file, the file inspector 328 or the cache manager 326 may provide the requested file to the compiler 306, such that the compiler 306 can convert the requested file. For example, in some embodiments, the compiler 306 may include a file converter 330 to convert the requested file. However, the present disclosure is not limited thereto, and in other embodiments, the interceptor 302 may include the file converter to convert the requested file. In various embodiments, whenever the requested file is converted, the converted file may be stored in the cache 308 for subsequent retrieval in response to subsequent requests for the requested file and subsequent compilations within the project build 312 (before the ending of that project build 312). For example, in various embodiments, whenever the compiler 306 converts a file for a project build 312, the compiler 306 may provide the converted file to the interceptor 302 for storage in the cache 308, or the compiler 306 may directly interface with the cache 308 to store any converted files in the cache 308. Accordingly, subsequent requests for the same file of the project build (before the ending of the project build) may be retrieved and provided from the cache 308, such that the file does not need to be converted again.

Still referring to FIG. 3, in some embodiments, the cache manager 326 may communicate with the build manager 304 (e.g., via the editor interface 314) to manage the cache 308 for each new compilation of the project build 312. For example, in some embodiments, because the build manager 304 manages the project build 312, the build manager 304 has insight into all the files and compilation units required to compile the project build 312, and thus, can determine the starting and ending of the project build, including when a first compilation of the project build 312 is started and a last compilation of the project build 312 is completed. In some embodiments, the build manager 304 may inform the cache manager 326 when the first compilation of a project build is started, such that the cache manager 326 refreshes (e.g., purges) the cache 308 for each new project build 312. In other embodiments, the build manager 304 may inform the cache manager when the compilation is completed, such that the cache manager 326 refreshes (e.g., purges) the cache 308 for each completed compilation. For example, in some embodiments, at the start of a project make or project build, the build manager 304 may trigger a start cache command, and/or at the end of the project make or project build, the build manager 304 may trigger a matching end cache command, such that the cache manager 326 can refresh (or purge) the cache 308 based on the start cache command and/or the end cache command.

In other embodiments, the cache manager 326 may communicate with the build manager 304 (e.g., via the editor interface 314) to maintain the cache 308 for a plurality of compilations of the project build 312. For example, in some embodiments, because the build manager 304 has insight into all of the changes made to the project build 312 (including the files associated with the project build 312) between compilations, the build manager 304 can inform the cache manager 326 when particular files should be purged from the cache 308. For example, in some embodiments, the build manager 304 may inform the cache manager 326 of all of the files that have been changed since the last compilation of the project build 312, and the cache manager 326 can purge those files that are stored in the cache 308 while maintaining other files in the cache 308 that have not been changed since the last compilation. Thus, when the compiler 306 requests a file that has been purged from the cache 308, the requested file is retrieved from the file buffer 310 to be converted and stored in the cache 308, such that the files stored in the cache 308 include the updated versions. Accordingly, in some embodiments, the cache manager 326 can provide requested files from the cache 308 for a plurality of compilations of the project build 312, while ensuring that the files stored in the cache 308 are the updated versions between compilations. In this case, in some embodiments, the build manager 304 may trigger the start cache command for a new project build rather than for each compilation, such that the cache manager 326 purges the cache 308 based on the start cache command and maintains the cache 308 when the start cache command is not triggered.

In some embodiments, the cache manager 326 may monitor the cache memory of the cache 308 to prevent or reduce over-consumption of the cache memory. For example, in some embodiments, the cache manager 326 may balance the cache memory with the amount of memory required by the compiler 306 to compile the project build 312 to minimize or reduce impact to other processes. In some embodiments, if the cache manager 326 determines that the compiler 306 may require more memory for the compilation, the cache manager 326 may purge the cache 308 and prevent further storing of converted files in the cache 308. For example, in some embodiments, the cache manager 308 may turn off caching of converted files, such that any requested file is retrieved from the file buffer 310 and converted in real-time as needed or desired.

Figure 4:
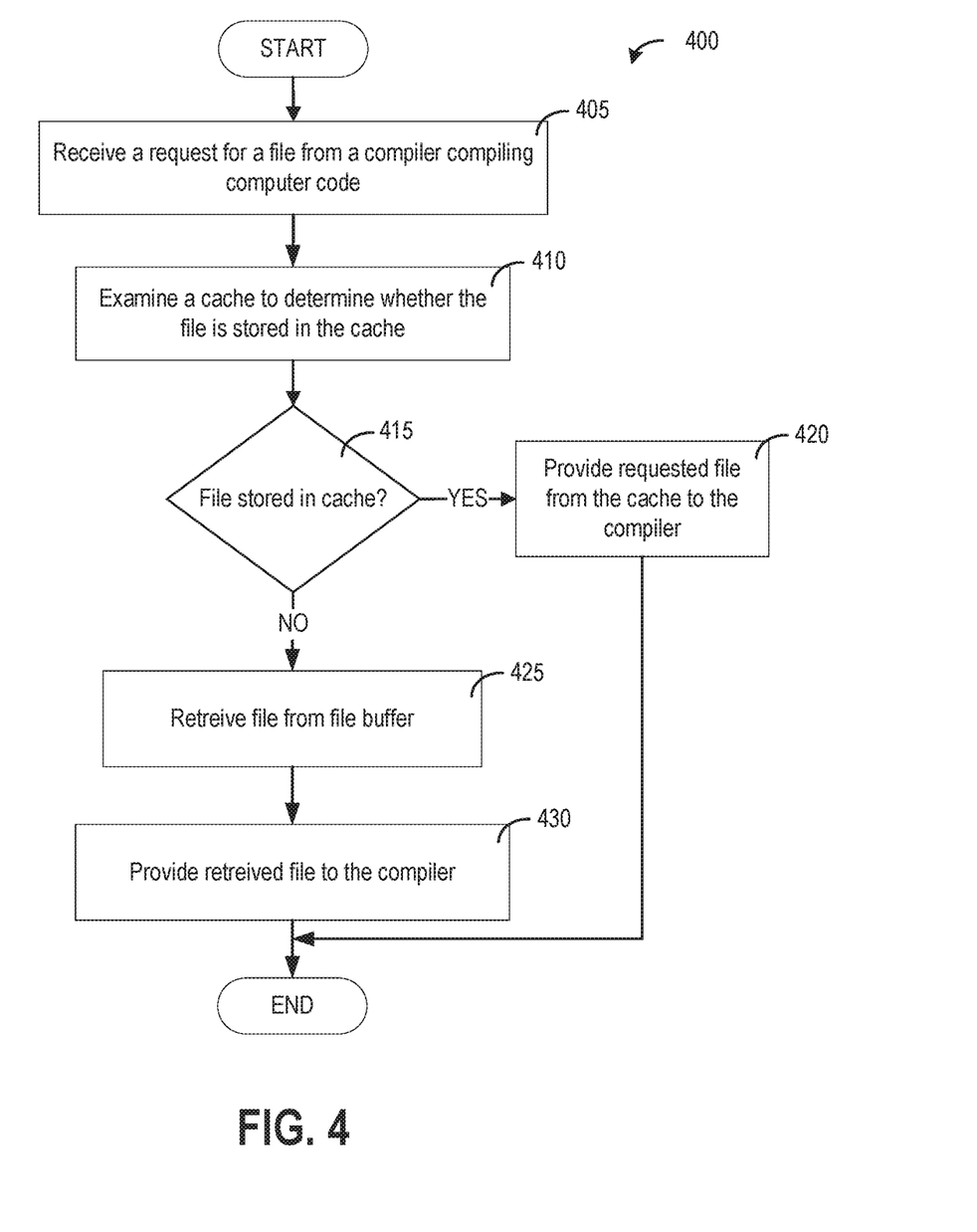
FIG. 4 is a flow diagram of a method for processing file requests during compilation of computer code, according to some embodiments.

FIG. 4 is a flow diagram of a method 400 for processing file requests during compilation of computer code, according to some embodiments. The functionalities of the method or process 400 may be implemented using, or performed by, the components detailed herein in connection with FIGS. 1-3. In brief overview, the method 400 of FIG. 4 may be used to provide converted files from a cache to a compiler. For example, the method 400 of FIG. 4 may be performed by the interceptor 302 of FIG. 3, between the starting and ending of a project build 312, in response to each file request received from the compiler during compilation of computer code between a start cache command and an end cache command for the project build 312.

In more detail, during compilation of computer code of a project build 312, the compiler may come across a file retrieval statement (e.g., #include) to retrieve a file for the compilation. In various embodiments, the file may be a source file, a header file, a PCH file, a resource file, or the like. In response to the file retrieval statement, the compiler requests the file, and the interceptor 302 receives (or intercepts) the file request. For example, the method 400 starts (e.g., upon or after starting of the project build 312), and at operation 405, the interceptor 302 receives the request for the file from the compiler compiling the computer code. In some embodiments, the inputs and outputs of the compiler may be channeled through a set of routines that are redirected to entry points of a dll of the interceptor 302. In some embodiments, the dll of the interceptor 302 includes the cache manager 326 and the file inspector 328 shown in FIG. 3, for example.

At operation 410, the cache manager 326 examines a cache to determine whether the requested file is stored in the cache. In some embodiments, the cache already stores the requested file if the requested file has already been examined and converted. For example, in various embodiments, the compiler may have already requested the same file during the compilation of another source of the same project build, or the compiler may have already requested the same file during a previous compilation of the project build. In either case, in some embodiments, if the requested file was previously examined and converted, the converted file may be stored in the cache. However, the present disclosure is not limited thereto, and in other embodiments, the requested file may be stored in the cache if the requested file has already been examined, regardless of whether the requested file has been converted or not.

Accordingly, at operation 415, the cache manager 326 determines whether the file (e.g., the requested file) is stored in the cache. If the requested file is stored in the cache at operation 415 (e.g., YES), then the requested file is provided from the cache to the compiler at operation 420. In some embodiments, since only converted files are stored in the cache, the file does not need to be converted again. If the requested file is not stored in the cache at operation 415 (e.g., NO), then the requested file is retrieved from a file buffer at operation 425, and provided to the compiler at operation 430. For example, in various embodiments, the file retrieved from the file buffer at operation 425 may be determined to not need conversion, may be provided to the compiler to be converted by the compiler, or may be first converted and then provided to the compiler (e.g., before or after storing the converted file in the cache). Accordingly, in various embodiments, files that have already been converted may be provided from the cache, such the files may be provided in response to subsequent requests for the same file without having to convert the file again, for the project build 312. For project builds in which the same file is requested multiple times between the starting and ending of the project build, the ability to provide the converted file from the cache (instead of converting the same file each time it is requested) can reduce (or significantly reduce) processing time and processing power needed for the project build.

Figure 5:
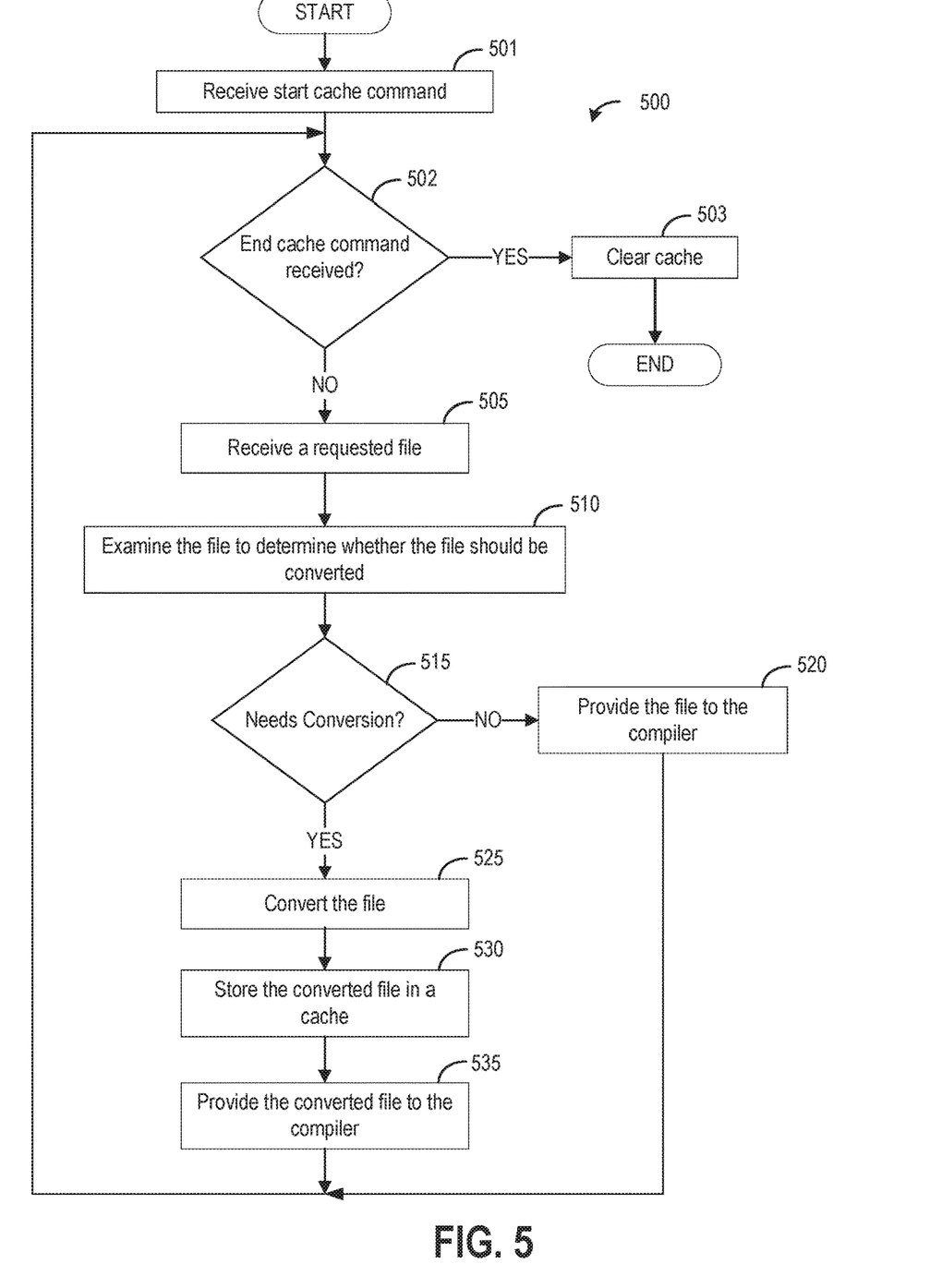
FIG. 5 is a flow diagram of a method for storing converted files in a cache for compilation of computer code, according to some embodiments.

FIG. 5 is a flow diagram of a method for storing converted files in a cache for compilation of computer code, according to some embodiments. The functionalities of the method or process 500 may be implemented using, or performed by, the components detailed herein in connection with FIGS. 1-3. In brief overview, the method 500 of FIG. 5 may be used to examine a retrieved file in response to a file request, which is similar to the operations 425 and 430 described with reference to FIG. 4. For example, the method 500 of FIG. 5 may be performed by the interceptor 302 of FIG. 3 in response to retrieving the file from the file buffer at operation 425 of FIG. 4.

In more detail, in response to determining that the cache does not store the requested file at operation 415 of FIG. 4 (e.g., NO), the requested file is retrieved from the file buffer at operation 425 of FIG. 4. The method 500 of FIG. 5 is carried out over a project build and may include (in certain examples) an operation 501 in which the interceptor 304 receives a start cache command. In certain examples, the receipt of the start cache command initiates a method 500 for a project build (or portion of a project build). After receipt of the stare cache command, the method 500 determines, at operation 502, whether or not an end cache command has been received (indicating an end of a project build or portion of a project build). If so (e.g., YES) at operation 502 in FIG. 5, then, at operation 502, the interceptor 302 clears the cache 308 and the method ends. That YES leg of the method 500 may occur during a project build (or portion of a project build), for example, after one or more (or a plurality) of instances in which the operation 502 has been carried out and resulted in a NO determination in that project build (or the portion of the project build). If, at operation 502 in FIG. 5, it is determined that an end cache commend has not been received (e.g., NO at 502), then the method 500 includes the operation 505 in which the requested file is received. For example, in some embodiments, the interceptor 302 may request the requested file from the build manager 304, and the build manager 304 may provide the requested file from the file buffer 310 to the interceptor 302.

At operation 510, the interceptor 302 examines the file to determine whether the file should be converted. In some examples, the interceptor 302 determines whether or not the requested file is already in the cache 308 in a converted form (or other form) and, thus, can be retrieved from the cache without further conversion, as discussed above with regard to operations 410 and 415 in FIG. 4. Alternatively or in addition, in some embodiments, the build manager 304 may set (or assign) a flag associated with the requested file indicating whether the file should be converted or not and, at operation 510, the interceptor 302 determines whether or not the flag is set. For example in some embodiments, the build manager 304 may determine a type of the requested file, and may indicate that only the files corresponding to source files and header files should be converted. In some embodiments, the build manager 304 may determine from the encoding of the source or header files or from a defined code page associated with the source or header files whether the source or header file should be converted. For example, in some embodiments, if the encoding or defined page code of the source or header files is different from a default or expected page code of the compiler, the build manager 304 may set the flag to indicate that the corresponding source or header file should be converted. In some embodiments, the file inspector 328 may inspect the flag associated with the requested file to determine whether the file should be converted or does not need conversion. In other embodiments, the file inspector 328 may determine the type of the requested file to determine whether or not the file should be converted.

Accordingly, if, upon examining the file in operation 510 in FIG. 5, the file inspector 328 determines, at operation 515 in FIG. 5, that the file does not need to be converted (e.g., NO at operation 515), then the file (not converted or not further converted) is provided to the compiler at operation 520. If the file inspector 328 determines that the file should be converted at operation 515 (e.g., YES), then the file is converted at operation 525, stored in the cache at operation 530, and the converted file is provided to the compiler at operation 535. After a file is provided to the compiler (in either operation 520 or in operation 535), the method 500 returns to the operation of 502 of determining whether or not an end cache command has been received. The method 500 carries on from operation 502, as described herein, until an end cache command is received (YES at 502 in FIG. 5) and the cache is cleared (at 503 in FIG. 5). In various embodiments, operations 525, 530, and 535 may be performed in any suitable order. For example, in various embodiments, the file inspector 328 or the cache manager 326 may convert the file or the file may be provided to the compiler to convert the file. In some embodiments, if the file inspector 328 or the cache manager 326 converts the file, then the file may be converted at operation 525, and may either be stored in the cache at operation 530 before providing the converted file to the compiler at operation 535, or may be provided to the compiler 535 and then stored in the cache at operation 530. In some embodiments, if the compiler converts the file, then the file may first be provided to the compiler at operation 535 to convert the file at operation 525, and then may be provided to the cache manager 326 to store the converted file in the cache at operation 530 or may be stored directly in the cache by the compiler. Accordingly, for a given project build (or portion of a project build), the cache manager 302 may populate the cache with converted source and/or header files the first time that the source and/or header files are requested by the compiler, and may thereafter provide the converted source and/or header files from the cache for subsequent requests for the same file without having to convert the source and/or header files again.

While examples described above include a code generator for generating and managing a project-wide cache of converted source and/or header files for a compiler, other examples may employ systems and processes as described herein for other types of conversions. In those other example embodiments, the code generator 130 may generate and manage a project-wide cache of other types of converted files or data structure (e.g., instead of converted source and/or header files for a compiler). In such other examples, the compiler may be converter, such as a language or data translator, an encryption or decryption converter, or another type of converter (for converting a the cache of converted files or data structures that may include, but are not limited to language or data translations, encrypted or decrypted content, or the like).

What is claimed is:

1. A software or data conversion system comprising:
a build manager configured to manage a project build, wherein the project build comprises compiling or converting of the computer code or data between a starting and an ending of at least a portion of the project build;
a file storage device communicatively connected to the build manager and configured to store original files associated with computer code or data of the project build, wherein the computer code or the data is configured to be edited during the project build;
a compiler or converter configured to compile or convert the computer code or data;
a cache configured to store converted files associated with the computer code or data; and
an interceptor configured to provide requested files to the compiler or converter while compiling or converting the computer code or data, the interceptor comprising:
one or more processors; and
memory coupled to the one or more processors and storing instructions that, when executed by the one or more processors, cause the one or more processors to:
receive a plurality of file requests for files from the compiler while compiling or converting the computer code or data between a starting and an ending of at least a portion of the project build;
examine the cache to determine whether a requested file is stored in the cache, for each of the file requests received while compiling or converting the computer code or data between the starting and ending of the portion of the project build; and
provide the requested file to the compiler or converter.

2. The system of claim 1, wherein the instructions further cause the one or more processors to:
determine that the file is stored in the cache; and
in response to determining that the file is stored in the cache, provide the file from the cache to the compiler or converter.

3. The system of claim 2, wherein the file stored in the cache has been converted in response to a previous file request for the same file from the compiler or converter while compiling or converting the computer code or data.

4. The system of claim 1, wherein the instructions further cause the one or more processors to:
determine that the file is not stored in the cache; and
provide the file from the file storage device to the compiler or converter.

5. The system of claim 4, wherein the instructions further cause the one or more processors to:
retrieve the file from the file storage device;
examine the file to determine whether the file should be converted;
convert the file in response to determining that the file should be converted; and
store the converted file in the cache.

6. The system of claim 5, wherein the build manager is configured to determine whether the file is in need of conversion, and to assign a flag associated with the file indicating whether the file should be converted.

7. The system of claim 6, wherein the build manager is configured to determine whether the file is in need of conversion based on a file type of the file.

8. The system of claim 6, wherein the build manager is configured to determine whether the file is in need of conversion based on a comparison of an encoding of the file and a default expected encoding of the compiler or the converter.

9. The system of claim 1, wherein the interceptor is configured to purge the cache for a new project build.

10. The system of claim 1, wherein the interceptor is configured to purge particular files from the cache in response to the particular files being modified between compilations or conversions.

11. A method for compiling or converting computer code or data of a project build, the method comprising:

storing, by one or more processors, original files associated with the computer code or data in a file storage device;

receiving, by one or more processors, a file request for a file from a compiler or converter while compiling the computer code or converting of the data;

examining, by the one or more processors, a cache to determine whether the file is stored in the cache; and providing, by the one or more processors, the file to the compiler or the converter.

12. The method of claim 11, further comprising:

determining, by the one or more processors, that the file is stored in the cache; and in response to determining that the file is stored in the cache, providing, by the one or more processors, the file from the cache to the compiler or the converter.

13. The method of claim 12, wherein the file stored in the cache has been converted in response to a previous file request for the same file from the compiler while compiling the computer code or from the converter while converting the data.

14. The method of claim 11, further comprising:

determining, by the one or more processors, that the file is not stored in the cache; and providing, by the one or more processors, the file from the file storage device to the compiler or the converter.

15. The method of claim 14, further comprising:

retrieving, by the one or more processors, the file from the file storage device;

examining, by the one or more processors, the file to determine whether the file should be converted;

converting, by the one or more processors, the file in response to determining that the file should be converted; and storing, by the one or more processors, the converted file in the cache.

16. The method of claim 15, further comprising:

determining, by the one or more processors, whether the file is in need of conversion; and assigning, by the one or more processors, a flag associated with the file indicating whether the file should be converted.

17. The method of claim 16, wherein the determining of whether the file is in need of conversion is based on a file type of the file.

18. The method of claim 16, wherein the determining of whether the file is in need of conversion is based on a comparison of an encoding of the file and a default expected encoding of the compiler or the converter.

19. The method of claim 11, further comprising purging, by the one or more processors, the cache in response to a new project build.

20. The method of claim 11, further comprising purging, by the one or more processors, particular files from the cache in response to the particular files being modified between compilations or conversions.

* * * * *